(12) United States Patent  
Shibata (10) Patent No.: US 12,526,639 B2
(45) Date of Patent: Jan. 13, 2026

(54) COMMUNICATION DEVICE, AND A TERMINAL DEVICE FOR ESTABLISHING A WI-FI CONNECTION WITH A TARGET ACCESS POINT

(71) Applicant: BROTHER KOGYO KABUSHIKI KAISHA, Nagoya (JP)

(72) Inventor: Hiroshi Shibata, Yatomi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 208 days.

(21) Appl. No.: 18/477,711

(22) Filed: Sep. 29, 2023

(65) Prior Publication Data

US 2024/0114344 A1 Apr. 4, 2024

(30) Foreign Application Priority Data

Sep. 30, 2022 (JP) ................................ 2022-158051

(51) Int. Cl.
| | |
|---|---|
| *H04W 12/06* | (2021.01) |
| *H04W 12/77* | (2021.01) |
| *H04W 76/14* | (2018.01) |
| *H04W 88/08* | (2009.01) |

(52) U.S. Cl.
CPC ........... *H04W 12/77* (2021.01); *H04W 76/14* (2018.02); *H04W 88/08* (2013.01)

(58) Field of Classification Search
CPC ...... H04W 12/77; H04W 76/14; H04W 88/08
USPC .......................................................... 726/4
See application file for complete search history.

(56) References Cited

U.S. PATENT DOCUMENTS

| | | | | |
|---|---|---|---|---|
| 10,585,632 | B2 * | 3/2020 | Suzuki | .................. G06F 3/1297 |
| 10,613,805 | B2 * | 4/2020 | Tsuji | ..................... G06F 3/1238 |
| 10,976,971 | B2 * | 4/2021 | Miyake | ................... H04W 4/80 |
| 11,064,362 | B2 * | 7/2021 | Suzuki | ................. H04W 12/06 |

(Continued)

FOREIGN PATENT DOCUMENTS

| | | | | |
|---|---|---|---|---|
| JP | 2017135518 A | * | 8/2017 | ............ H04W 84/18 |
| JP | 2020-108064 A | | 7/2020 | |

OTHER PUBLICATIONS

Wi-Fi Easy Connect Specification Version 2.0 Wi-Fi Alliance, 2020, published by the Wi-Fi alliance.

*Primary Examiner* — Haresh N Patel
(74) *Attorney, Agent, or Firm* — Scully, Scott, Murphy & Presser, P.C.

(57) ABSTRACT

A communication device may output a code image representing code information including a public key of the communication device and specific network identification information. In a first case where the public key included in the code information is used by a terminal device, the communication device may receive first connection information from the terminal device by executing a predetermined communication in which the public key is used with the terminal device, and establish a Wi-Fi connection with a target access point by using the first connection information. In a second case where the specific network identification information included in the code information is used, the communication device may establish a Wi-Fi connection with the terminal device; receive second connection information from the terminal device by using the Wi-Fi connection with the terminal device, and establish a Wi-Fi connection with the target access point by using the second connection information.

13 Claims, 4 Drawing Sheets

(56) References Cited

U.S. PATENT DOCUMENTS

| | | | |
|---|---|---|---|
| 11,134,529 B2* | 9/2021 | Takeuchi | G06F 3/1292 |
| 2019/0303065 A1* | 10/2019 | Shibata | G06F 3/1236 |
| 2019/0306707 A1* | 10/2019 | Shibata | H04W 12/0431 |
| 2019/0306712 A1* | 10/2019 | Suzuki | H04W 12/06 |
| 2020/0214059 A1 | 7/2020 | Suzuki | |
| 2021/0007164 A1* | 1/2021 | Shibata | H04L 9/30 |
| 2021/0099950 A1* | 4/2021 | Shibata | H04L 9/3247 |
| 2021/0282205 A1 | 9/2021 | Suzuki | |
| 2022/0312515 A1 | 9/2022 | Suzuki | |

* cited by examiner

FIG. 2

COMMUNICATION DEVICE, AND A TERMINAL DEVICE FOR ESTABLISHING A WI-FI CONNECTION WITH A TARGET ACCESS POINT

REFERENCE TO RELATED APPLICATION

This application claims priority from Japanese Patent Application No. 2022-158051 filed on Sep. 30, 2022. The entire content of the priority application is incorporated herein by reference.

BACKGROUND ART

A Device Provisioning Protocol (DPP) which is a wireless communication scheme established by the Wi-Fi Alliance is known. The DPP is a wireless communication scheme for facilitating establishment of a Wi-Fi connection between a pair of devices.

DESCRIPTION

Aspects of the disclosure provides a technique that may suitably establish a Wi-Fi connection between a communication device and an access point.

A communication device disclosed herein may include: a Wi-Fi interface configured to execute wireless communication in conformity with a Wi-Fi standard; and a controller, wherein the controller may be configured to: cause an outputting unit to output a code image representing code information, wherein the code information includes a public key of the communication device and specific network identification information for identifying a specific wireless network; in a first case where the public key included in the code information is used by a terminal device which is different from the communication device in response to the code image being captured by the terminal device: receive first connection information from the terminal device by executing a predetermined communication in which the public key is used with the terminal device via the Wi-Fi interface; and establish a Wi-Fi connection with a target access point via the Wi-Fi interface by using the first connection information; in a second case where the specific network identification information included in the code information is used by the terminal device in response to the code image being captured by the terminal device: establish a Wi-Fi connection with the terminal device via the Wi-Fi interface; receive second connection information from the terminal device via the Wi-Fi interface by using the Wi-Fi connection with the terminal device; and establish a Wi-Fi connection with the target access point via the Wi-Fi interface by using the second connection information.

According to the above configuration, the communication device outputs the code image representing the code information including the public key of the communication device and the specific network identification information. In the first case where the public key is used by the terminal device in response to the code image being captured by the terminal device, the communication device receives the first connection information from the terminal device and establishes a Wi-Fi connection with the target access point by using the first connection information. On the other hand, in the second case where the specific network identification information is used by the terminal device in response to the code image being captured by the terminal device, the communication device receives the second connection information from the terminal device and establishes a Wi-Fi connection with the target access point by using the second connection information. As above, the communication device can suitably establish a Wi-Fi connection with the target access point by executing processes in accordance with which one of the public key and the specific network identification information is used by the terminal device.

Also, a non-transitory computer-readable recording medium storing an application program including computer-readable instructions for a terminal device is disclosed herein. The terminal device may include: a Wi-Fi interface configured to execute wireless communication in conformity with a Wi-Fi standard; and a processor. The computer-readable instructions, when executed by the processor, may cause the terminal device to: obtain specific information related to a communication device, wherein the specific information includes a public key of the communication device and specific network identification information for identifying a specific wireless network; in a case where the specific information is obtained, determine whether the terminal device is capable of executing a predetermined communication in which the public key is used; in a first case where it is determined that the terminal device is capable of executing the predetermined communication, supply the public key to an OS program, wherein in a case where the OS program obtains the public key from the application program, the OS program sends first connection information to the communication device by executing the predetermined communication with the communication device via the Wi-Fi interface, the first connection information being for establishing a Wi-Fi connection between the communication device and a target access point; in a second case where it is determined that the terminal device is not capable of executing the predetermined communication: supply the specific network identification information to the OS program, wherein in a case where the OS program obtains the specific network identification information from the application program, the OS program establishes a Wi-Fi connection with the communication device via the Wi-Fi interface by using the specific network identification information; and send second connection information to the communication device via the Wi-Fi interface by using the Wi-Fi connection with the communication device, the second connection information being for establishing a Wi-Fi connection between the communication device and the target access point.

According to the above configuration, in a case where the specific information including the public key of the communication device and the specific network identification information is received, the application program determines whether the terminal device is capable of executing the predetermined communication using the public key. In the first case where it is determined that the terminal device is capable of executing the predetermined communication, the application program supplies the public key to the OS program. As a result of this, the first connection information is sent to the communication device by the OS program, and a Wi-Fi connection is established between the communication device and the target access point. On the other hand, in the second case where it is determined that the terminal device is not capable of executing the predetermined communication, the application program supplies the network identification information to the OS program. In this case, the OS program establishes a Wi-Fi connection with the communication device by using the specific network identification information. The application program uses this Wi-Fi connection to send the second connection information to the communication device. As a result, a Wi-Fi connection is established between the communication device and the target access point. As above, the terminal device executes a process in accordance with whether the terminal device is capable of executing the predetermined communication or not, and causes a Wi-Fi connection to be suitably established between the communication device and the target access point.

Computer program including computer-readable instructions for the communication device, a non-transitory computer-readable recording medium storing the computer-readable instructions for the communication device, and a method performed by the communication device are also novel and useful. Further, the terminal device itself realized by the application program and a method performed by the terminal device are also novel and useful.

Figure 1:
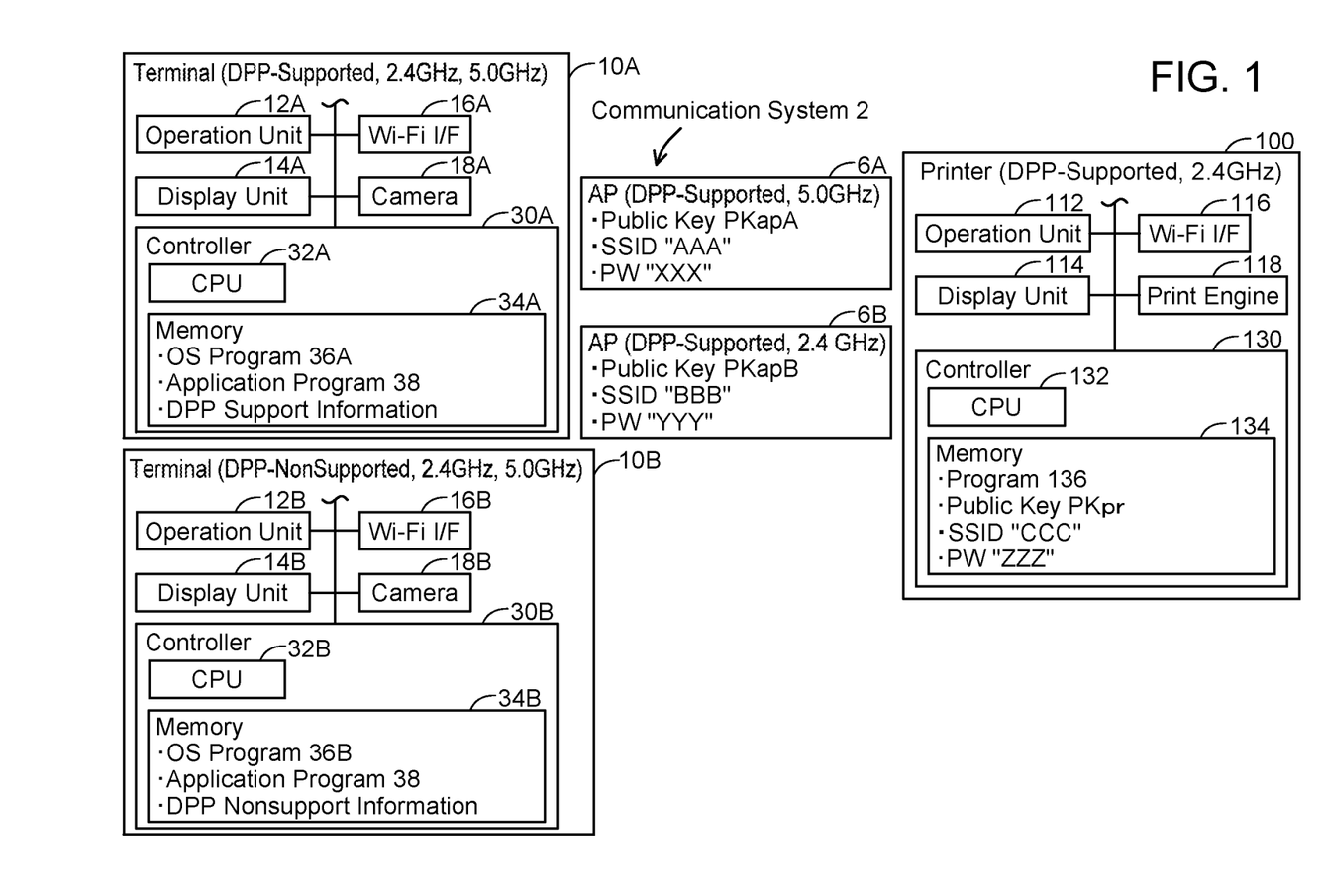
FIG. 1 shows a configuration of a communication system.

Configuration of Communication System 2; FIG. 1

As shown in FIG. 1, a communication system 2 comprises two access points 6A, 6B, two terminals 10A, 10B, and a printer 100. Hereinbelow, an access point will be termed "AP". Aspects of the disclosure provides a technique that may establish a wireless connection in conformity with the Wi-Fi standard between the AP 6A or the AP 6B and the printer 100 using the terminal 10A or the terminal 10B. Hereinbelow, a wireless connection in conformity with the Wi-Fi standard will be termed "Wi-Fi connection".

Configuration of Terminal 10A

The terminal 10A is a portable terminal device such as a cellular phone, a smartphone, a PDA, and a tablet PC. In a modification, the terminal 10A may be a desktop PC or a laptop PC. The terminal 10A comprises an operation unit 12A, a display unit 14A, a Wi-Fi interface 16A, a camera 18A, and a controller 30A. The respective units 12A to 30A are connected to a bus line. Hereinbelow, an interface will be termed "I/F".

The operation unit 12A is an I/F that enables a user to input various types of information to the terminal 10A, and may for example comprise a touch screen and buttons. The user can input various types of information to the terminal 10A using the operation unit 12A. The display unit 14A is a display for displaying various types of information. The camera 18A is a device for capturing images of an object. In the present embodiment, the camera 18A is used to capture a QR Code displayed on the printer 100. The QR Code is a registered trademark of DENSO WAVE Inc.

The Wi-Fi I/F 16A is a wireless I/F for executing Wi-Fi connection in conformity with the Wi-Fi standard. The Wi-Fi standard is a wireless communication standard for executing wireless communication in conformity with the 802.11 standard or its compliant standards such as 802.11a, 11b, 11g, 11n, and 11ac of the Institute of Electrical and Electronics Engineers, Inc. (IEEE). Especially, the Wi-Fi I/F 16A supports the Device Provisioning Protocol (DPP) created by the Wi-Fi alliance. Details of the DPP is described in the standard "Wi-Fi Easy Connect Specification Version 2.0" published by the Wi-Fi alliance.

Further, the terminal 10A is configured to establish a Wi-Fi connection with an AP by using a Service Set Identifier (SSID) and a password of a wireless network formed by this AP. Hereinbelow, a password will be termed "PW".

In Wi-Fi communication, one of multiple types of frequency bands (e.g., 1.0 GHz and 6.0 GHz) including two frequency bands of 2.4 GHz and 5.0 GHz is used. In the description herein, a situation will be assumed in which radio waves on either the 2.4 GHz frequency band or the 5.0 GHz frequency band are used in the Wi-Fi communication. The Wi-Fi I/F 16A supports both 2.4 GHz and 5.0 GHz. That is, the Wi-Fi I/F 16A is capable of executing wireless communication using 2.4 GHz radio waves and also wireless communication using 5.0 GHz radio waves.

The controller 30A comprises a CPU 32A and a memory 34A. The memory 34A stores an OS program 36A and an application program 38. The CPU 32A is configured to execute various processes in accordance with the OS program 36A and the application program 38 stored in the memory 34A. The memory 34A may for example be a ROM and a RAM. Hereinbelow, an OS program will be termed "OS". Further, an application program will be termed "app".

The OS 36A controls basic operations of the terminal 10A. The app 38 is capable of causing the OS 36A to execute processes in conformity with the DPP to establish a Wi-Fi connection between the terminal 10A and one of AP 6A and AP 6B or between the printer 100 and the AP 6B. The app 38 may for example be downloaded from a server provided by a vendor of the printer 100 on the Internet and be installed in the terminal 10A.

The memory 34A further stores DPP support information. The DPP support information is information indicating that the Wi-Fi I/F 16 supports DPP.

Configuration of Terminal 10B

The terminal 10B is a portable terminal device such as a cellular phone, a smartphone, a PDA, and a tablet PC. In a modification, the terminal 10B may be a desktop PC or a laptop PC. The terminal 10B comprises an operation unit 12B, a display unit 14B, a Wi-Fi interface 16B, a camera 18B, and a controller 30B. The respective units 12B to 30B are connected to a bus line. The controller 30B comprises a CPU 32B and a memory 34B.

Configurations of the respective units 12B to 34B are same as the configurations of the respective units 12A to 34A of the terminal 10A except that the Wi-Fi I/F 16B does not support DPP. That is, the Wi-Fi I/F 16B supports conventional Wi-Fi schemes but does not support DPP. As such, the memory 34B further stores DPP nonsupport information indicating that the Wi-Fi I/F 16B does not support DPP.

Configuration of Printer 100

The printer 100 is a peripheral device configured to execute a print function, and is a peripheral device of the terminals 10A, 10B, for example. In a modification, the printer 100 may be a multi-function peripheral configured to execute a scan function and a facsimile function in addition to the print function. The printer 100 comprises an operation unit 112, a display unit 114, a Wi-Fi I/F 116, a print engine 118, and a controller 130. The respective units 112 to 130 are connected to a bus line.

The operation unit 112 is an I/F that enables the user to input various types of information to the printer 100, and may for example comprise a touch screen and buttons. The user can input various types of information to the printer 100 using the operation unit 112. The operation unit 112 especially comprises a Wi-Fi button being a button that enables communication via the Wi-Fi I/F 116. The display unit 114 is a display for displaying various types of information. The print engine 118 comprises a printing mechanism that employs an inkjet scheme or a laser scheme, for example.

The Wi-Fi I/F 116 is basically identical to the Wi-Fi I/F 16A of the terminal 10A, however, it supports only the 2.4 GHz frequency band and does not support the 5.0 GHz frequency band. That is, the Wi-Fi I/F 116 is capable of executing only the wireless communication using 2.4 GHz radio waves.

The controller 130 comprises a CPU 132 and a memory 134. The CPU 132 is configured to execute various processes in accordance with a program 136 stored in the memory 134. The memory 134 may for example be a ROM and a RAM. The memory 134 further stores a public key PKpr, an SSID "CCC", and a PW "ZZZ". The public key PKpr is information that is to be used when processes conforming to DPP are executed. The SSID "CCC" and the PW "ZZZ" are information to be used in a wireless network formed by the printer 100 operating as a Soft AP.

Configuration of AP 6A

The AP 6A is a device for communicably connecting devices belonging to a wireless network in which the AP 6A itself operates as a parent station. The AP 6A stores a public key PKapA, an SSID "AAA", and a PW "XXX". The public key PKapA is information that is to be used when processes conforming to DPP are executed. The SSID "AAA" and the PW "XXX" are information used in the wireless network formed by the AP 6A. The AP 6A supports only the 5.0 GHz frequency band.

Configuration of AP 6B

The AP 6B stores a public key PKapB, an SSID "BBB", and a PW "YYY". The AP 6B supports only the 2.4 GHz frequency band. Other than that, it is the same as the configuration of the AP 6A.

Figure 2:
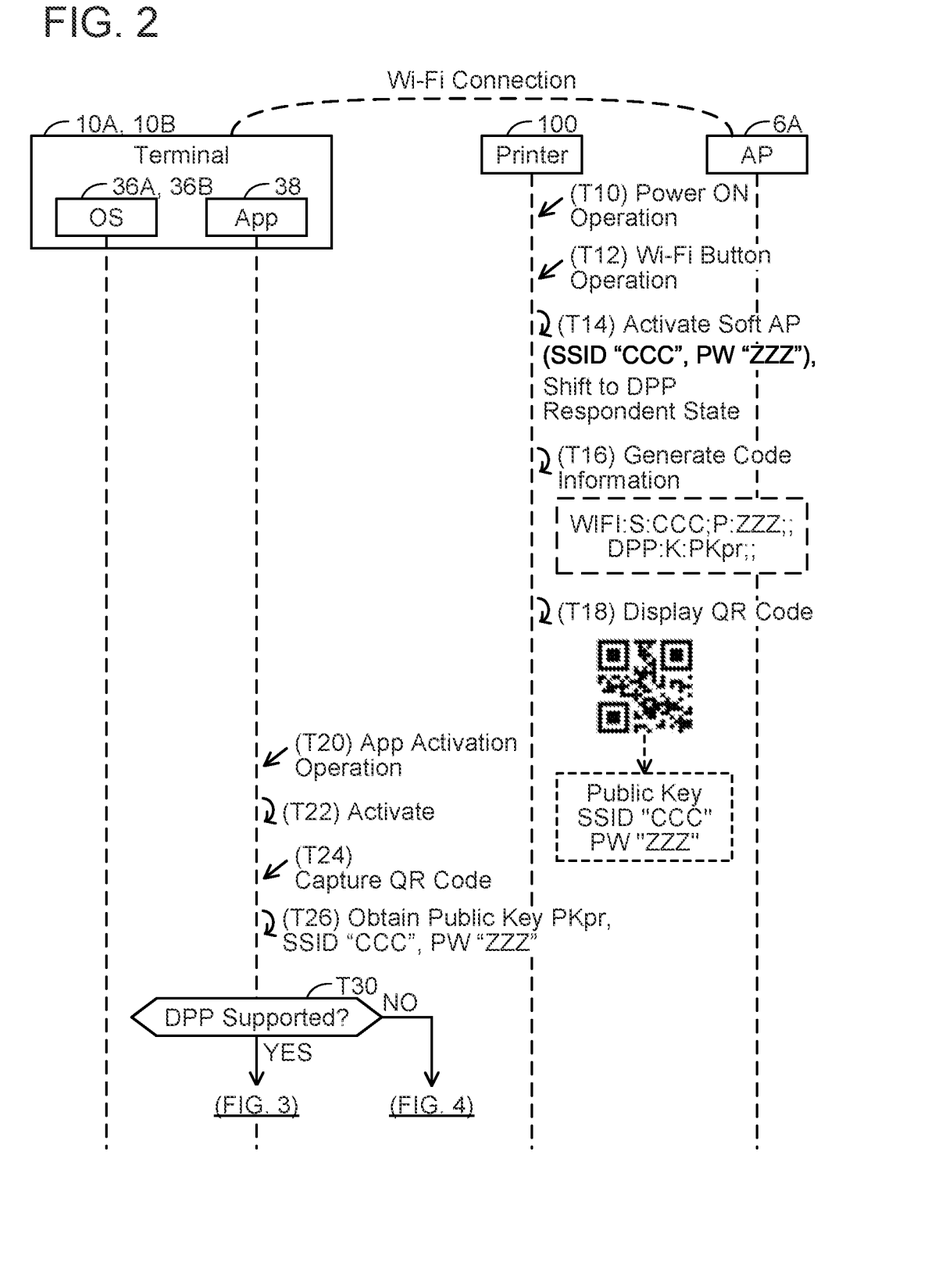
FIG. 2 shows a sequence diagram of processes executed between devices.

Processes Executed between Devices; FIG. 2

Next, processes executed between the devices will be described with reference to FIG. 2. Hereinbelow, for the sake of easier understanding, processes executed by the CPUs (such as 32A, 32B, 132) of the respective devices (such as the terminals 10A, 10B and the printer 100) will be described with the respective devices as the subject of action instead of the respective CPUs as the subject of action. Especially, among processes executed by the CPUs of the terminals, when processes that are realized by the CPU executing the OS are to be explained, the OS will be described as the subject of action for those processes instead of describing the terminal as the subject of action. Similarly, among the processes executed by the CPUs of the terminals, when processes that are realized by the CPU executing the app are to be explained, the app will be described as the subject of action for those processes instead of describing the terminal as the subject of action. Further, communication between the respective devices is executed via Wi-Fi I/Fs (such as 16A, 16B, 116). As such, in the following description, the description "via the Wi-Fi I/F" will be omitted in the explanations related to communication.

In FIG. 2, the terminal 10A and the terminal 10B are represented by the same box. This means that either the terminal 10A or the terminal 10B is operated by the user.

Hereinbelow, the terminal operated by the user may be termed "target terminal". In an initial state of FIG. 2, a Wi-Fi connection is established between the target terminal and the AP 6A.

In T10, when the printer 100 detects a power-ON operation by the user, it turns on the power. After this, when the printer 100 detects an operation on the Wi-Fi button by the user in T12, it activates Soft AP and shifts from a DPP nonrespondent state to a DPP respondent state in T14. The DPP nonrespondent state is a state in which an authentication response conforming to DPP cannot be sent. The DPP respondent state is a state in which the authentication response conforming to DPP can be sent. The printer 100 operates as the parent station of the wireless network by activating the Soft AP.

In T16, the printer 100 generates code information. The code information includes a letter string "WIFI:S:CCC;P:ZZZ:;;DPP:K:PKpr;;". The letter string "WIFI:S:CCC;P:ZZZ:;" indicates that the SSID of the wireless network formed by the printer 100 operating as the Soft AP is "CCC" and the PW is "ZZZ". Further, the letter string "DPP:K:PKpr;;" indicates that the public key used in DPP is "PKpr". The format of the letter string "DPP:K:PKpr;;" is described according to Bootstrapping Information Format defined in DPP. Due to this, the terminal that obtained the code information can recognize the SSID "CCC", the password "ZZZ", and the public key PKpr. The code information may include, in addition to the foregoing information, information related to a serial number and a MAC address.

In T18, the printer 100 displays a QR Code obtained by coding the code information on the display unit 114. As above, since the QR Code is displayed after the Soft AP of the printer 100 has been activated, a Wi-Fi connection is suitably established between the target terminal and the printer 100 operating as the Soft AP as will be described later in FIG. 4. Hereinbelow, the Wi-Fi connection established between the target terminal and the printer 100 operating as the Soft AP will be termed "Soft AP connection".

In T20, the target terminal detects an app activation operation by the user. In this case, the app 38 installed in the target terminal is activated in T22. The app activation operation may for example be an operation of selecting an icon of the app 38.

The app 38 activates the camera 18A or 18B. Then, in T24, when the app 38 detects the QR Code being captured by the user, it decodes this QR Code. As a result, the app 38 can obtain the SSID "CCC", the PW "ZZZ", and the public key PKpr included in the code information in T26.

In T30, the app 38 determines whether the target terminal supports DPP. Specifically, the app 38 obtains either the DPP support information or the DPP nonsupport information from the memory of the target terminal. In a case where the app 38 obtains the DPP support information, it determines YES to T30 and proceeds to the process of FIG. 3. On the other hand, in a case where the app 38 obtains the DPP nonsupport information, it determines NO to T30 and proceeds to the process of FIG. 4. Alternatively in a modification, the app 38 may determine NO to T30 in a case where the DPP support information cannot be obtained from the memory of the target terminal.

Figure 3:
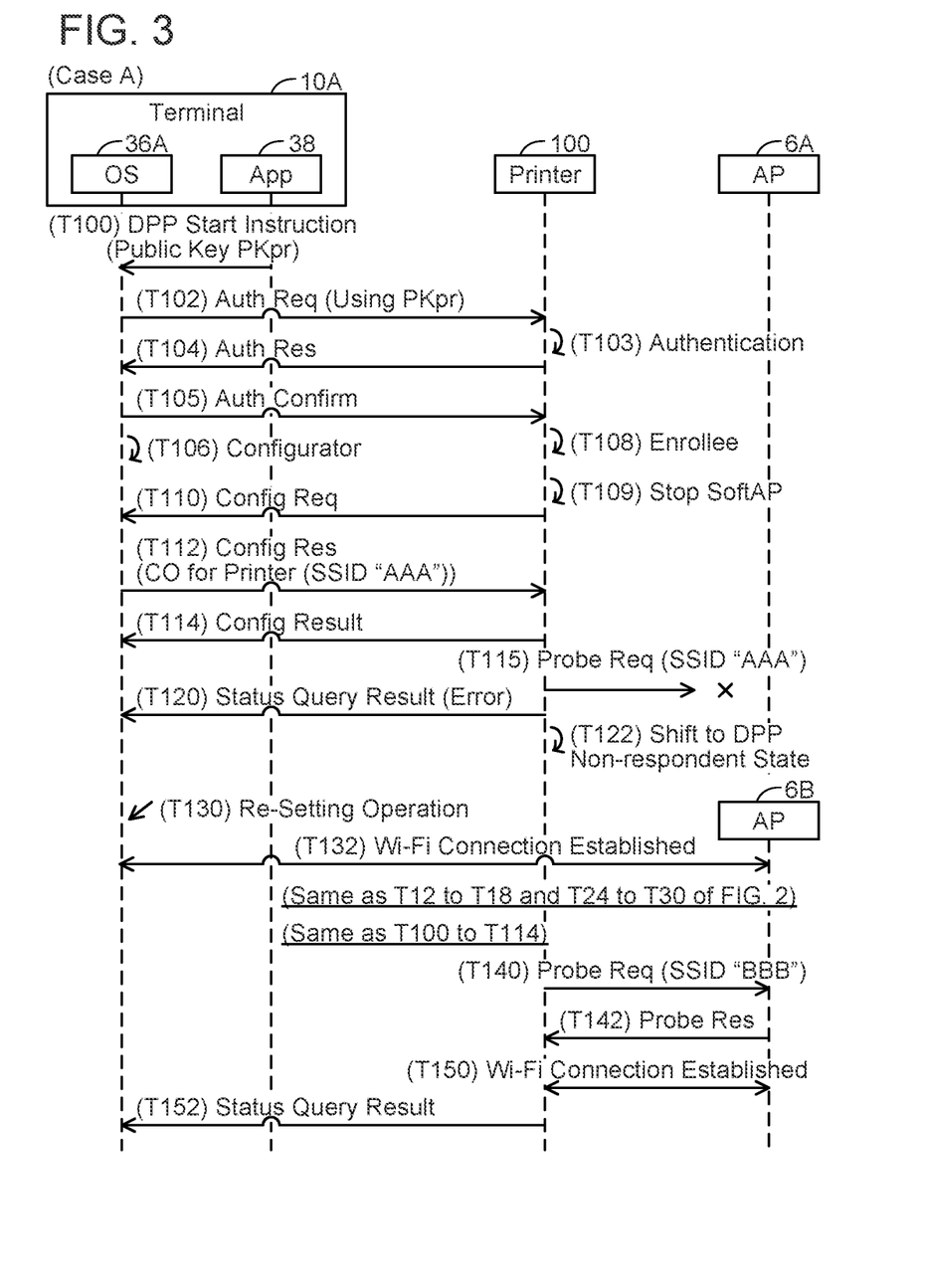
FIG. 3 shows a sequence diagram of Case A.

Case A; FIG. 3

Next, Case A will be described with reference to FIG. 3. Case A is the case of determining YES to T30 in FIG. 2, that is, the case where the target terminal is the terminal 10A supporting DPP.

In T100, the app 38 supplies a DPP start instruction to the OS 36A. The DPP start instruction includes the obtained public key PKpr of the printer 100 (see T26 of FIG. 2). The DPP start instruction is an instruction requesting the OS 36A to execute various types of communication conforming to DPP. The processes of T24 and T26 of FIG. 2 correspond to Bootstrapping in DPP.

In obtaining the DPP start instruction from the app 38 in T100, the OS 36A sends an Authentication Request in which the public key PKpr included in the DPP start instruction is used to the printer 100 in T102. Hereinbelow, an Authentication will be termed "Auth". Further, a Request will be termed "Req".

The Auth Req is a signal requesting to execute authentication of the terminal 10A that is the sender thereof. Specifically, the OS 36A firstly generates a shared key using a private key of the terminal 10A and the public key PKpr of the printer 100, and generates encrypted data by encrypting a random value using the shared key. Then, the OS 36A sends Auth Req including the public key of the terminal 10A, the encrypted data, and Capability of the terminal 10A to the printer 100. The Capability of the terminal 10A includes a value indicating that the terminal 10A can operate only as a DPP Configurator.

When the Auth Req is received from the terminal 10A in T102, the printer 100 executes authentication of the encrypted data included in the Auth Req in T103. Specifically, the printer 100 uses the public key of the terminal 10A included in the Auth Req and a private key of the printer 100 to generate a shared key, and decrypts the encrypted data using the shared key. In a case where this decryption of the encrypted data is successful, the printer 100 determines that the authentication was successful, and proceeds to execute processes from T104.

In T104, the printer 100 sends Auth Response including Capability of the printer 100 to the terminal 10A. Hereinbelow, a Response will be termed "Res". The Capability of the printer 100 includes a value indicating that the printer 100 can operate only as a DPP Enrollee.

When the Auth Res is received from the printer 100 in T104, the OS 36A determines that the Capability of the printer 100 included in the Auth Res (i.e., Enrollee) does not match the Capability of the terminal 10A (i.e., Configurator). Then, in T105, the OS 36A sends an Auth Confirm to the printer 100. The Auth Confirm includes information indicating that the terminal 10A operates as the Configurator and the printer 100 operates as the Enrollee. As a result, the OS 36A determines in T106 to operate as the Configurator. The Configurator is a device that serves a role of sending Configuration Object to be described later to the Enrollee. Hereinbelow, a Configuration Object will be termed "CO".

Further, in T108, the printer 100 determines to operates as the Enrollee. The Enrollee is a device that serves a role of receiving the CO from the Configurator. The processes from T102 to T108 correspond to Auth in DPP.

Further, when the Auth Confirm is received from the terminal 10A in T105, the printer 100 stops the Soft AP in T109. In Case A, the Soft AP is not used. Since the unnecessary Soft AP is stopped, processing load on the printer 100 can be reduced as compared to a case of maintaining the Soft AP.

In T110, the printer 100 sends a Configuration Req to the terminal 10A. Hereinbelow, a Configuration will be termed "Config". The Config Req is a signal requesting transmission of a CO.

When the Config Req is received from the printer 100 in T110, the OS 36A generates a CO for printer. Specifically, the OS 36A firstly generates the CO for printer being information to be used by the printer 100 for establishing the Wi-Fi connection. The CO for printer includes the SSID "AAA" and the PW "XXX" of the wireless network formed by the AP 6A, for example. Then, in T112, the OS 36A sends a Config Res including the CO for printer to the printer 100.

When the Config Res is received from the terminal 10A in T112, the printer 100 sends a Config Result to the terminal 10A in T114. The processes from T110 to T114 correspond to Config in DPP.

In T115, the printer 100 broadcasts a Probe Req including the SSID "AAA" that was included in the CO for printer. However, in the present case, the printer 100 supports only 2.4 GHz while the AP 6A supports only 5.0 GHz. Due to this, the Probe Req is not received by the AP 6A.

In T115, the printer 100 does not receive the Probe Res from the AP 6A even when a predetermined time elapses since when the Probe Req was sent. In this case, in T120, the printer 100 sends a Status Query Result including error information indicating that no Wi-Fi connection was established to the terminal 10A. Hereinbelow, a Status Query Result will be termed "Result".

When the Result including the error information is sent to the terminal 10A in T120, the printer 100 shifts from the DPP respondent state to the DPP nonrespondent state in T122.

In T130, the OS 36A detects a re-setting operation by the user. The re-setting operation is an operation for causing a Wi-Fi connection to be established with the AP 6B that is different from the AP 6A. As a result, in T132, a Wi-Fi connection is established between the terminal 10A and the AP 6B. In the present embodiment, the terminal 10A has already established a Wi-Fi connection with the AP 6B in the past, thus already stores the SSID "BBB" and the PW "YYY" for establishing the Wi-Fi connection with the AP 6B. As such, the terminal 10A can establish the Wi-Fi connection with the AP 6B in T132 by using the stored SSID "BBB" and PW "YYY".

After this, processes similar to T12 to T18 and T24 to T30 of FIG. 2 are executed. Then, processes similar to T100 to T114 of FIG. 3 are executed. However, a CO for printer generated in T112 includes the SSID "BBB" and the PW "YYY" of the wireless network formed by the AP 6B. T140 is similar to T115. Since both the printer 100 and the AP 6B support 2.4 GHz, a Probe Req is received by the AP 6B.

When the Probe Req is received from the printer 100 in T140, the AP 6B sends a Probe Res to the printer 100 in T142. As a result, a Wi-Fi connection is established between the printer 100 and the AP 6B in T150. The processes of T140 and T142 correspond to Network Access in DPP.

As above, the Wi-Fi connection is established between the printer 100 and the AP 6B by the respective types of communication conforming to DPP being executed between the terminal 10A and the printer 100. Due to this, the printer 100 participates in the wireless network in which the AP 6B operates as the parent station. As a result, both the terminal 10A and the printer 100 participate in the wireless network formed by the AP 6B. Due to this, the printer 100 can receive print data from the terminal 10A via the AP 6B and execute printing according to the print data.

Next, in T152, the printer 100 sends a Result to the terminal 10A. This Result includes information indicating that the Wi-Fi connection between the printer 100 and the AP 6B has been established.

Figure 4:
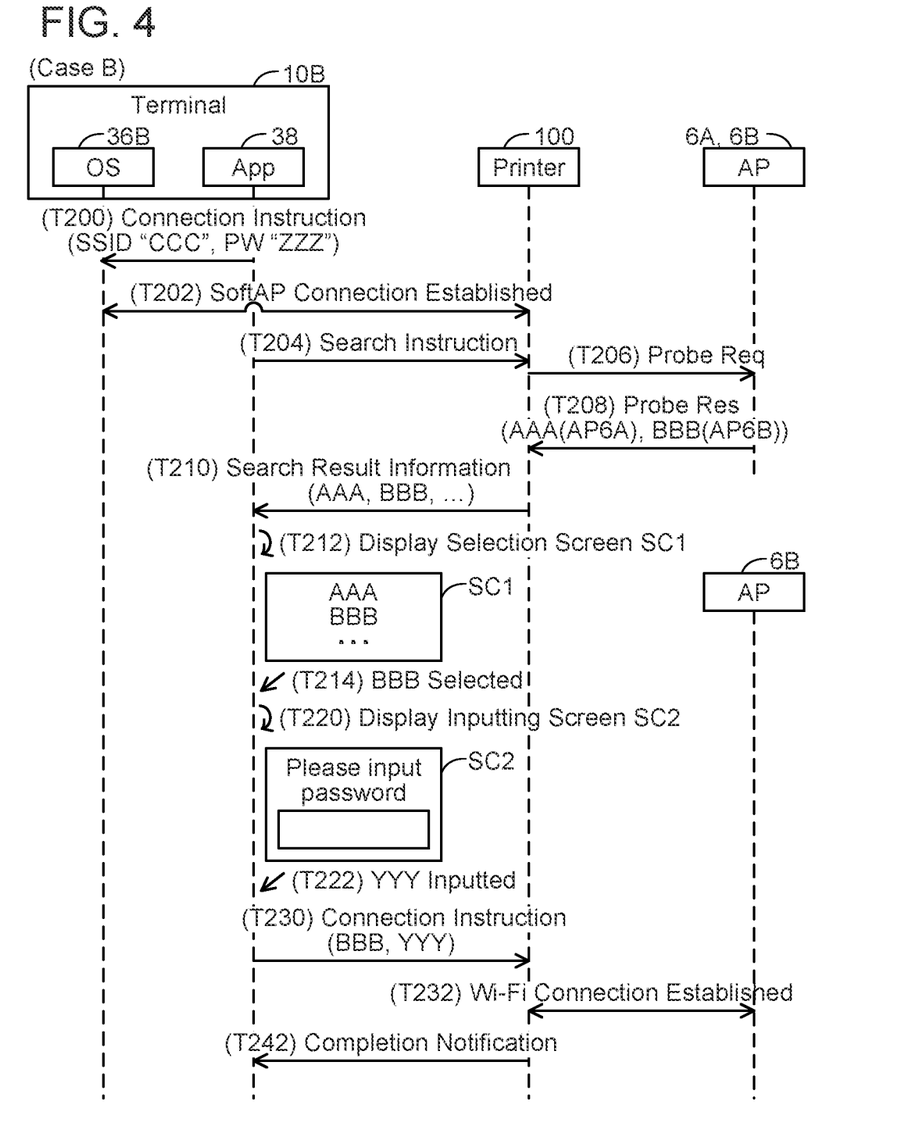
FIG. 4 shows a sequence diagram of Case B.

Case B; FIG. 4

Next, Case B will be described with reference to FIG. 4. Case B is the case of determining NO to T30 in FIG. 2, that is, the case where the target terminal is the terminal 10B not supporting DPP.

In T200, the app 38 supplies a connection instruction to the OS 36B. The connection instruction includes the obtained SSID "CCC" and PW "ZZZ" (see T26 of FIG. 2). The connection instruction is an instruction requesting the OS 36B to cause the terminal 10B to establish a Soft AP connection with the printer 100 via the wireless network identified by the obtained SSID "CCC". As a result, in T202, a Soft AP connection is established between the terminal 10B and the printer 100. Specifically, the terminal 10B sends the obtained SSID "CCC" and PW "ZZZ" to the printer 100. The printer 100 executes authentication of the SSID "CCC" and PW "ZZZ". In the present case, this authentication results in success. That is, the printer 100 determines that a combination of the SSID "CCC" and PW "ZZZ" is already stored. In this case, the Soft AP connection is established between the terminal 10B and the printer 100.

In T204, the app 38 uses the Soft AP connection to send a search instruction to the printer 100.

When the search instruction is received from the terminal 10B in T204, the printer 100 sends a Probe Req in T206 and receives a Probe Res from each of the APs 6A, 6B existing around the printer 100, that is, within a communicable range of Wi-Fi communication with the printer 100 in T208. Specifically, the printer 100 receives the Probe Res including the SSID "AAA" from the AP 6A. Further, the printer 100 receives the Probe Res including the SSID "BBB" from the AP 6B. Then, in T210, the printer 100 uses the Soft AP connection to send search result information including the received SSIDs "AAA" and "BBB" to the terminal 10B. As above, the printer 100 can search for AP(s) existing around the printer 100.

When the search result information is received from the printer 100 in T210, the app 38 displays a selection screen SC1 including the SSIDs "AAA" and "BBB" that were included in the search result information in T212. When a user's selection of the SSID "BBB" in the selection screen SC1 is detected in T214, the app 38 displays a PW input screen SC2 in T220. When a user's input of the PW "YYY" to the PW input screen SC2 is detected in T222, the app 38 sends a connection instruction including the SSID "BBB" and the PW "YYY" to the printer 100 in T230.

When the connection instruction is received from the terminal 10B in T230, the printer 100 uses the connection information included in the connection instruction to establish a Wi-Fi connection with the AP 6B in T232. Specifically, the printer 100 sends the received connection information to the AP 6B. The AP 6B executes authentication of the connection information. In the present case, this authentication of the connection information results in success. That is, the AP 6B determines that a combination of the SSID "BBB" and the PW "YYY" included in the connection information is already stored. In this case, the Wi-Fi connection is established between the printer 100 and the AP 6B.

In T242, the app 38 uses the Soft AP connection to receive a completion notification from the printer 100.

After this, the Soft AP connection between the terminal 10B and the printer 100 is disconnected, and the Wi-Fi connection between the terminal 10B and the AP 6B is established. The terminal 10B has established a Wi-Fi connection with the AP 6B in the past, and thus already stores the SSID "BBB" and the PW "YYY" for establishing the Wi-Fi connection with the AP 6B. As such, the terminal 10B can establish the Wi-Fi connection with the AP 6B using the stored SSID "BBB" and PW "YYY". As a result, both the terminal 10B and the printer 100 participate in the wireless network formed by the AP 6B. Due to this, the printer 100 can receive print data from the terminal 10B via the AP 6B and execute printing according to the print data.

Effects of Embodiment

According to the above configuration, the printer 100 displays the QR Code (T18 of FIG. 2) obtained by coding the public key PKpr, the SSID "CCC", and the PW "ZZZ". The app 38 obtains the public key PKpr, the SSID "CCC", and the PW "ZZZ" (T26) in response to this QR Code being captured (T24), and determines whether the target terminal in which this app 38 is installed supports DPP (T30). In the case where the target terminal is the terminal 10A supporting DPP (YES to T30 of FIG. 2 and FIG. 3), the app 38 supplies the public key PKpr to the OS 36A (T100 of FIG. 3). As a result, the CO for printer is sent from the terminal 10A to the printer 100 (T112) and the Wi-Fi connection is established between the printer 100 and the AP 6B (T150). On the other hand, in the case where the target terminal is the terminal 10B not supporting DPP (NO to T30 of FIG. 2 and FIG. 4), the app 38 supplies the SSID "CCC" and the PW "ZZZ" to the OS 36B (T200 of FIG. 4), and the Soft AP connection is established between the terminal 10B and the printer 100. As a result, the connection instruction including the SSID "BBB" and the PW "YYY" of the AP 6B is sent from the terminal 10B to the printer 100 via the Soft AP connection (T230), and the Wi-Fi connection is established between the printer 100 and the AP 6B (T232). As above, due to processes according to whether the target terminal supports DPP or not being executed, the Wi-Fi connection is suitably established between the printer 100 and the AP 6B.

Corresponding Relationship

The printer 100 is an example of "communication device". In Case A, the terminal 10A is an example of "terminal device". In Case B, the terminal 10B is an example of the "terminal device". The OSs 36A, 36B are examples of "OS program". The app 38 is an example of "application program". The AP 6B is an example of "target access point". The public key PKpr of the printer 100 is an example of "public key". The state in which the Soft AP is activated is an example of "parent state". The state in which the Soft AP is stopped is an example of "non-parent state". The wireless network formed by the Soft AP of the printer 100 being activated is an example of "specific wireless network". The SSID "CCC" of this wireless network is an example of "specific network identification information". The code information including the public key PKpr and the SSID "CCC" is an example of "code information" and "specific information". The QR Code is an example of "code image". The display unit 114 of the printer 100 is an example of "outputting unit". The CO for printer is an example of "first connection information". The SSID "BBB" and the PW "YYY" of the wireless network formed by the AP 6B are examples of "second connection information". The Auth Req in T102 of FIG. 3 is an example of "authentication request". The Auth Res in T104 is an example of "authentication response". The Config Req in T110 is an example of "connection information request". Communication executed in T102, T104, T105, T110, and T112 of FIG. 3 is an example of "predetermined communication". The letter string "K:" included in the code information is an example of "predetermined identifier".

The process of T14 of FIG. 2 is an example of "shift an operation state of the communication device from a non-parent state to a parent state" executed by the "communication device". The process of T18 of FIG. 2 is an example of "cause an outputting unit to output a code image" executed by the "communication device". The processes of T102, T104, T105, T108, T110, and T112 of FIG. 3 are examples of "receive first connection information" executed by the "communication device". The process of T109 of FIG. 3 is an example of "shift the operation state of the communication device from the parent state to the non-parent state" executed by the "communication device". The process of T150 of FIG. 3 is an example of "establish a Wi-Fi connection with a target access point via the Wi-Fi interface by using the first connection information" executed by the "communication device". The process of T202 of FIG. 4 is an example of "establish a Wi-Fi connection with the terminal device" executed by the "communication device". The process of T230 of FIG. 4 is an example of "receive second connection information" executed by the "communication device". The process of T232 of FIG. 4 is an example of "establish a Wi-Fi connection with the target access point via the Wi-Fi interface by using the second connection information" executed by the "communication device".

The process of T26 of FIG. 2 is an example of "obtain specific information" executed by the "application program". The process of T30 of FIG. 2 is an example of "determine whether the terminal device is capable of executing a predetermined communication" executed by the "application program". The process of T100 of FIG. 3 is an example of "supply the public key" executed by the "application program". The process of T200 of FIG. 4 is an example of "supply the specific network identification information" executed by the "application program". The process of T230 of FIG. 4 is an example of "send second connection information" executed by the "application program".

The process of T26 of FIG. 2 is an example of "obtain specific information" executed by the "terminal device". The process of T30 of FIG. 2 is an example of "determine whether the terminal device is capable of executing predetermined communication" executed by the "terminal device". The processes of T102, T104, T105, T106, T110, and T112 of FIG. 2 are examples of "send first connection information" executed by the "terminal device". The process of T202 of FIG. 4 is an example of "establish a Wi-Fi connection with the communication device" executed by the "terminal device". The process of T230 of FIG. 4 is an example of "send second connection information" executed by the "terminal device".

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(Modification 1) The printer 100 may print the QR Code instead of displaying the QR Code. In this modification, the print engine 118 is an example of the "outputting unit". Further, printing the QR Code is an example of "cause an outputting unit to output a code image" executed by the "communication device".

(Modification 2) The terminal may obtain the public key PKpr of the printer 100 and the like by capturing the QR Code adhered to the printer 100 instead of capturing the QR Code displayed on the printer 100. In this modification, the process of obtaining the public key PKpr and the like by capturing the QR Code adhered to the printer 100 is an example of "obtain specific information" executed by the "application program" and/or the "terminal device". In another modification, the terminal 10A or 10B may for example obtain the public key PKpr and the like from the printer 100 via Bluetooth communication or near field communication (NFC). Bluetooth is a registered trademark of Bluetooth SIG. In these modifications, obtaining the public key PKpr and the like by the Bluetooth communication and obtaining the public key PKpr and the like by the NFC communication are examples of "obtain specific information" executed by the "application program" and/or the "terminal device".

(Modification 3) Instead of activating the Soft AP in T14 of FIG. 2, the printer 100 may shift to a Group Owner in Wi-Fi Direct of the Wi-Fi standard. The Wi-Fi Direct is a registered trademark of the Wi-Fi Alliance. In this modification, the wireless network formed by the printer 100 operating as the Group Owner is an example of the "specific wireless network". Further, in another modification, the printer 100 may form an Ad hoc network instead of activating the Soft AP in T14 of FIG. 2. In this modification, the Ad hoc network is an example of the "specific wireless network".

(Modification 4) The OS 36A may send a CO for printer including a Signed-Connector for printer including a hash value, a group ID identifying the wireless network formed by the AP 6A, the public key of the printer 100, and an electronic signature to the printer 100 instead of sending the CO for printer including the SSID "AAA" and PW "XXX" to the printer 100 in T112 of FIG. 3. Hereinbelow, a Signed-Connector will be termed "SC". In this case, in T115 of FIG. 3, the printer 100 may broadcast a DPP Peer Discovery Req including the aforementioned SC for printer instead of the Probe Req. Similarly, in T140, the printer 100 may broadcast a DPP Peer Discovery Req including an SC for printer including a group ID identifying the wireless network formed by the AP 6B. The DPP Peer Discovery Req is a signal requesting execution of authentication and transmission of an SC of its communication counterpart. When the authentication of the SC for printer is successful, the AP 6B may generate a connection key and send a DPP Peer Discovery Res including an SC for AP 6B to the printer 100 in T142. Further, when authentication of the SC for AP 6B is successful, the same connection key as above may be generated. As a result, the Wi-Fi connection may be established between the printer 100 and the AP 6B. In this modification, the CO for printer including the SC for printer including the group ID and the like is an example of the "first connection information".

(Modification 5) In T102 to T114 of FIG. 3, the respective types of communication executed between the terminal 10A and the printer 100 may be communication conforming to a scheme other than DPP.

(Modification 6) The printer 100 may be configured to operate as the Soft AP at all times. In this modification, "shift an operation state of the communication device from a non-parent state to a parent state" executed by the "communication device" may be omitted. Further, in another modification, the printer 100 may display the QR Code before the Soft AP is activated in T14 of FIG. 2. That is, a timing to execute "cause an outputting unit to output a code image" by the "communication device" is not limited to the timing in the embodiment.

(Modification 7) The code information may for example include a basic service set identifier (BSSID) of the wireless network formed by the printer 100 that operates as the Soft AP instead of the SSID "CCC". In this modification, the BSSID is an example of the "specific wireless network identification information". That is, the "specific wireless network identification information" may be any type of information so long as it identifies the wireless network formed by the printer 100.

(Modification 8) The printer 100 may omit the process of T109. In general terms, "shift the operation state of the communication device from the parent state to the non-parent state" executed by the "communication device" may be omitted.

(Modification 9) The code information may be information described according to a format different from the Bootstrapping Information Format.

(Modification 10) In the above embodiment, the printer 100 searched for AP(s) existing around the printer 100 in Case B (see T204 to T210 of FIG. 4). In a modification, the terminal 10B may search for AP(s) existing around the terminal 10B.

(Modification 11) In the above embodiment, the processes in the respective steps in FIGS. 2 to 4 are realized by software (e.g., OS 36A, 36B, app 38, program 136), however, at least one of these processes may be realized by hardware such as a logic circuit.

What is claimed is:

1. A communication device comprising:
a Wi-Fi interface configured to execute wireless communication in conformity with a Wi-Fi standard; and
a controller,
wherein the controller is configured to:
cause an outputting unit to display or print a code image representing code information, wherein the code information includes a public key of the communication device and network identification information for identifying a wireless network;
after the code image has been displayed or printed, in a case where first connection information is received from a terminal device by a predetermined communication in which the public key is used with the terminal device via the Wi-Fi interface without establishing a Wi-Fi connection with the terminal device via the Wi-Fi interface by the network identification information being used,
establish a Wi-Fi connection with a target access point via the Wi-Fi interface by using the first connection information,
after the code image has been displayed or printed, in a case where the Wi-Fi connection is established with the terminal device via the Wi-Fi interface by the network identification information being used without receiving the first connection information from the terminal device by the predetermined communication in which the public key is used with the terminal device via the Wi-Fi interface, receive second connection information from the terminal device via the Wi-Fi interface by using the Wi-Fi connection with the terminal device; and
establish a Wi-Fi connection with the target access point via the Wi-Fi interface by using the second connection information.

2. The communication device as in claim 1,
wherein the predetermined communication is a communication in conformity with a Device Provisioning Protocol (DPP) of the Wi-Fi standard, and
the predetermined communication includes:
receiving an authentication request in which the public key is used from the terminal device;
sending an authentication response to the terminal device;
sending a connection information request to the terminal device; and
receiving the first connection information from the terminal device.

3. The communication device as in claim 1,
wherein the controller is further configured to:
shift an operation state of the communication device from a non-parent state to a parent state, the non-parent state being a state not operating as a parent station of the wireless network, and the parent state being a state operating as the parent station, and
wherein the controller is configured to cause the outputting unit to display or print the code image after the operation state of the communication device has been shifted from the non-parent state to the parent state.

4. The communication device as in claim 3,
wherein the network identification information includes a Service Set Identifier (SSID) of the wireless network formed by the communication device that operates as the parent station.

5. The communication device as in claim 3,
wherein the controller is further configured to shift the operation state of the communication device from the parent state to the non-parent state in response to receiving a predetermined signal from the terminal device via the Wi-Fi interface.

6. The communication device as in claim 1,
wherein the code information includes a predetermined identifier and the public key subsequent to the predetermined identifier, the predetermined identifier being described according to a Bootstrapping Information Format defined in a Device Provisional Protocol (DPP) of the Wi-Fi standard.

7. The communication device as in claim 1,
wherein after the code image has been displayed or printed, in the case where the Wi-Fi connection is established with the terminal device via the Wi-Fi interface by the network identification information being used without receiving the first connection information from the terminal device by the predetermined communication in which the public key is used with the terminal device via the Wi-Fi interface, the target access point is an access point of one or more access points searched by the communication device or the terminal device.

8. A non-transitory computer-readable recording medium storing an application program including computer-readable instructions for a terminal device,
the terminal device comprising:

a Wi-Fi interface configured to execute wireless communication in conformity with a Wi-Fi standard; and
a processor,
wherein the computer-readable instructions, when executed by the processor, cause the terminal device to:
obtain specific information related to a communication device, wherein the specific information includes a public key of the communication device and network identification information for identifying a wireless network;
determine whether the terminal device has a function to execute a predetermined communication in which the public key is used;
when it is determined that the terminal device has the function to execute the predetermined communication, supply the public key to an OS program, wherein in a case where the OS program obtains the public key from the application program, the OS program sends first connection information to the communication device by executing the predetermined communication with the communication device via the Wi-Fi interface, the first connection information being for establishing a Wi-Fi connection between the communication device and a target access point;
when it is determined that the terminal device does not have the function to execute the predetermined communication: p2 supply the network identification information to the OS program, wherein in a case where the OS program obtains the network identification information from the application program, the OS program establishes a Wi-Fi connection with the communication device via the Wi-Fi interface by using the network identification information; and
send second connection information to the communication device via the Wi-Fi interface by using the Wi-Fi connection with the communication device, the second connection information being for establishing a Wi-Fi connection between the communication device and the target access point.

9. The non-transitory computer-readable recording medium as in claim 8,
wherein the predetermined communication is a communication in conformity with a Device Provisioning Protocol (DPP) of the Wi-Fi standard, and
the predetermined communication includes:
sending an authentication request in which the public key is used to the communication device;
receiving an authentication response from the communication device;
receiving a connection information request from the communication device; and
sending the first connection information to the communication device.

10. The non-transitory computer-readable recording medium as in claim 8,
wherein the computer-readable instructions, when executed by the processor, cause the terminal device to:
in a case where a code image representing the specific information is captured by the terminal device:
decode the code image; and
obtain the specific information.

11. The non-transitory computer-readable recording medium as in claim 8,
wherein the network identification information includes a Service Set Identifier (SSID) of the wireless network formed by the communication device that operates as a parent station.

12. A non-transitory computer-readable recording medium storing computer-readable instructions for a communication device,
the communication device comprising:
a Wi-Fi interface configured to execute wireless communication in conformity with a Wi-Fi standard; and
a processor,
wherein the computer-readable instructions, when executed by the processor, cause the communication device to:
cause an outputting unit to display or print a code image representing code information, wherein the code information includes a public key of the communication device and network identification information for identifying a wireless network;
after the code image has been displayed or printed in a case where first connection information is received from a terminal device by a predetermined communication in which the public key is used with the terminal device via the Wi-Fi interface without establishing a Wi-Fi connection with the terminal device via the Wi-Fi interface by the network identification information being used,
establish a Wi-Fi connection with a target access point via the Wi-Fi interface by using the first connection information,
after the code image has been displayed or printed,
in a case where the the Wi-Fi connection with the terminal device via the Wi-Fi interface by the network identification information being used without receiving the first connection information from the terminal device by the predetermined communication in which the public key is used with the terminal device via the Wi-Fi interface, receive second connection information from the terminal device via the Wi-Fi interface by using the Wi-Fi connection with the terminal device; and establish a Wi-Fi connection with the target access point via the Wi-Fi interface by using the second connection information.

13. A terminal device comprising:
a Wi-Fi interface configured to execute wireless communication in conformity with a Wi-Fi standard; and
a controller,
wherein the controller is configured to:
obtain specific information related to a communication device, wherein the specific information includes a public key of the communication device and network identification information for identifying a wireless network;
determine whether the terminal device has a function to execute a predetermined communication in which the public key is used;
when it is determined that the terminal device has the function to execute the predetermined communication, send first connection information to the communication device by executing the predetermined communication with the communication device via the Wi-Fi interface, the first connection information being for establishing a Wi-Fi connection between the communication device and a target access point;
when it is determined that the terminal device does not have the function to execute the predetermined communication:
establish a Wi-Fi connection with the communication device via the Wi-Fi interface by using the network identification information; and send second connection information to the communication device via the Wi-Fi interface by using the Wi-Fi connection with the communication device, the second connection information being for establishing a Wi-Fi connection between the communication device and the target access point.

* * * * *